United States Patent [19]
Isozaki

[11] Patent Number: 5,748,965
[45] Date of Patent: May 5, 1998

[54] LANGUAGE PROCESSING METHOD FOR CALCULATING OPTIMUM ADDRESS OF ARRAY

[75] Inventor: Hiroko Isozaki, Tokyo, Japan

[73] Assignee: NEC Corporation, Tokyo, Japan

[21] Appl. No.: 822,471

[22] Filed: Mar. 24, 1997

Related U.S. Application Data

[63] Continuation of Ser. No. 266,573, Jun. 28, 1994, abandoned.

[30] Foreign Application Priority Data

Jul. 1, 1993 [JP] Japan ................. 5-163384

[51] Int. Cl.$^6$ ............................ G06F 9/45
[52] U.S. Cl. ......................... 395/705; 395/708
[58] Field of Search ................. 395/705, 708, 395/709

[56] References Cited

U.S. PATENT DOCUMENTS

| | | | |
|---|---|---|---|
| 4,773,007 | 9/1988 | Kanada et al. | 395/700 |
| 5,210,876 | 5/1993 | Uchida | 395/700 |
| 5,283,901 | 2/1994 | Masuyama | 395/700 |
| 5,369,774 | 11/1994 | Hatakeyama | 395/800 |
| 5,371,711 | 12/1994 | Nakayama | 365/230.03 |

FOREIGN PATENT DOCUMENTS

0180077 A2  10/1985  European Pat. Off. .

OTHER PUBLICATIONS

James R. Cordy, et al., "Code Generation Using an Orthogonal Model", Mar. 1990, Software Practice and Experience, vol. 20(3), pp. 301–320.

J. Van Katwijk, "Addressing Types and Objects in Ada", May 1987, Software Practice and Experience, vol. 17(5), pp. 319–343.

Kathleen Jensen, et al., "PASCAL User Manual and Report", 1975, Springer–Verlag, pp. 36–43.

"Programming Languages—C"; International Standard, ISO/IEC 9899, First Edition 1990-12-15; pp. 3, 40, 46–47.

*Primary Examiner*—Emanuel T. Voeltz
*Assistant Examiner*—Peter J. Corcoran, III
*Attorney, Agent, or Firm*—Whitham, Curtis & Whitham

[57] ABSTRACT

A language processing method targeted at hardware having a data space greater than the data width of an architecture is improved in that address calculation of an array element is performed efficiently and the size of an object is reduced while the execution performance of the object is enhanced. A command which designates a maximum size of an array is inputted, and it is analyzed whether or not the designated size is equal to or smaller than a fixed size. When a result of the analysis is equal to or smaller than the fixed size, a subscript of the array is taken out first. An offset is calculated from contents of the subscript thus taken out and the data width of the array element, and an address of the array element is calculated from the offset thus calculated and the top address of the array.

17 Claims, 5 Drawing Sheets

| CCXX -short_array ··· INPUT SOURCE FILE NAME |

FIG. 4

```
extern long tab[];
void func(int i)
{
        tab[i]=1;
}
```

FIG. 5

```
    movw  r0,B ;8[rp5]    ;1      (4 BYTES)
    shlw  r0,04                   (2 BYTES)
    cnvwd rp0                     (2 BYTES)
    addd  rp0,#__tab              (6 BYTES)
    movw  [rp0],#1       ;1       (5 BYTES)
```

FIG. 6

```
    movw  r0,B :8[rp5]    ;i      (4 BYTES)
    cnvwd rp0                     (2 BYTES)
    shld  rp0,04                  (3 BYTES)
    addd  rp0,#__tab              (6 BYTES)
    movw  [rp0],#1       ;i       (5 BYTES)
```

```
short__array extern long tab1[];
extern int tab2[];
void func (int i,int j)
{
        tab1[i]=1;
        tab[j]=1;
}
```

LANGUAGE PROCESSING METHOD FOR CALCULATING OPTIMUM ADDRESS OF ARRAY

This is a Continuation of application Ser. No. 08/266,573 filed Jun. 28, 1994, now abandoned.

BACKGROUND OF THE INVENTION

1. Field of the Invention

This invention relates to a language processing method, and particularly to a language processing method used to compile a source program described in a language having an array structure such as the C language into object modules.

2. Description of the Prior Art

Files produced by compilation of a source program inputted by a language processing program are called object modules (hereinafter referred to as objects). Generally, for software processed by a language processing program, the speed is required as its execution performance. In order to realize a high speed execution performance, it is necessary that the sizes of the objects which are results of execution of language processing be small and that the execution of the objects be fast. Meanwhile, as the scale of software increases, the data space of hardware tends to expand.

In a conventional language processing method, as the expansion of the data space proceeds, the address calculation for calculating the position of an array element in the data space is performed in conformity with the size of the data space. If it is assumed that the data space is 4 gigabytes (=$2^{32}$ bytes), then representation of an address in the data space requires 32 bits=4 bytes. A method of conventional address calculation of an array element will be described with reference to FIG. 9 based on such assumption.

In a process for calculating an offset of an element of an array from the top of the array, a subscript of the array is taken out (step 901). Then, the contents of the subscript are extended to 4 bytes (step 902). Then, the contents (4 bytes) of the subscript after the extension are multiplied by a data width of elements of the array to calculate an offset (step 903). An offset is calculated by the steps described just above.

Subsequently, the address of the array element is calculated by taking out a top address of the array (step 904) and adding the array top address thus taken out to the offset calculated as above (step 905).

A language program produces an object in accordance with the calculation method described above. The reason why the contents of a subscript are extended to 4 bytes at step 902 is as follows. Generally in a high level language, an external reference of a variable is permitted in order to allow a link of a plurality of modules. However, if an external reference of an array is permitted similarly, then the size of the array becomes indefinite. Therefore, taking the possibility into consideration that the maximum value of an offset to be obtained may have an equal size to that of the data space, the processing for extension to 4 bytes is employed.

In the conventional method described above, since a subscript is extended to 4 bytes prior to multiplication for calculation of an offset, the size of one of the terms in calculation is 4 bytes, resulting in the problem that the load in execution of multiplication increases. This does not matter with language processing which is targeted to an architecture having a multiplication command which can designate 4 byte data as an operand, but where another architecture which includes a command of a bit width centered at 16 bits=2 bytes or a smaller bit width is targeted, the command size is greater where 4 byte data are handled than where 2 byte data are handled. In short, where the data width of the architecture is smaller than the address width of the data space, where the address calculation method for an array element described above is employed, the size of an object to be produced becomes great and the execution performance of the object is deteriorated.

As a countermeasure for the problem described above, the data space temporarily handled with a 16-bit architecture machine is set to a size with which an address can be represented with 16 bits. With the countermeasure, the subscript should be extended to 16 bits=2 bytes also in calculation of an array. Thus, since an offset is calculated by multiplication between 2-byte data and another data, if the size of the latter data is equal to or smaller than 2 bytes, then the multiplication can be performed by a single command.

However, in recent years, there is a tendency that the data space greater than the data width of an architecture is required. In this instance, also in address calculation of an array element, the problem arises that an object which is great in object size and low in execution performance is produced as described above.

However, even if the data space is expanded, merely a large number of data are handled, and the size of one array need not necessarily be 4 bytes.

SUMMARY OF THE INVENTION

It is an object of the present invention to provide a language processing method by which address calculation of an array element in language processing targeted at hardware having a data space greater than the data width of an architecture is performed efficiently to reduce the size of an object and enhance the execution performance of the object.

In order to attain the object described above, according to the present invention, there is provided a language processing method, which comprises the steps of inputting source program information, analyzing the thus inputted source program information to produce object information, calculating an address of an array element to be processed upon production of the object information, and outputting the object information thus produced, the step of calculating an address of an array element including the steps of inputting a command which designates a maximum size of the array and analyzing whether or not the designated size is equal to or smaller than a fixed size, taking out a subscript of the array when a result of the analysis is equal to or smaller than the fixed size, calculating an offset from contents of the subscript thus taken out and the data width of the array element, and calculating an address of the array element from the offset thus calculated and the top address of the array.

The array may be inputted from other than the source program information or alternatively from within the source program information.

With the language processing method, since an address calculation algorithm for an array element is selected in accordance with the size of the array designated by a command, the size of an object to be produced can be reduced.

Where the size of the array is equal to or smaller than the size of the int (e.g., data space) of a target machine, the size of the array can be reduced by one byte for address calculation of an array element by a command designation. In a machine which does not involve shift calculation of long data (4 bytes) of the C language, in the calculation method of the prior art, a shift of long data is realized by a library call, which results in increase of the object size and the execution time of a command. However, with the language processing method of the present invention, such increase can be eliminated.

In particular, by reducing the size of an object to be produced, the program space can be saved and reduction of the loading time of an object can be achieved.

The above and other objects, features and advantages of the present invention will become apparent from the following description and the appended claims, taken in conjunction with the accompanying drawings.

BRIEF DESCRIPTION OF THE DRAWINGS

FIG. 4 is a diagrammatic view showing an example of an input source file employed in the language processing method illustrated in FIG. 1;

FIG. 5 is a similar view but showing an example of an output object according to an array element address calculation algorithm employed in the array element address calculation algorithm selection processing illustrated in FIG. 4;

FIG. 6 is a similar view showing an example of an output object according to another array element address calculation algorithm employed in the array element address calculation algorithm selection processing illustrated in FIG. 4 and according to the prior art;

DESCRIPTION OF THE PREFERRED EMBODIMENTS

Figures 1, 2:
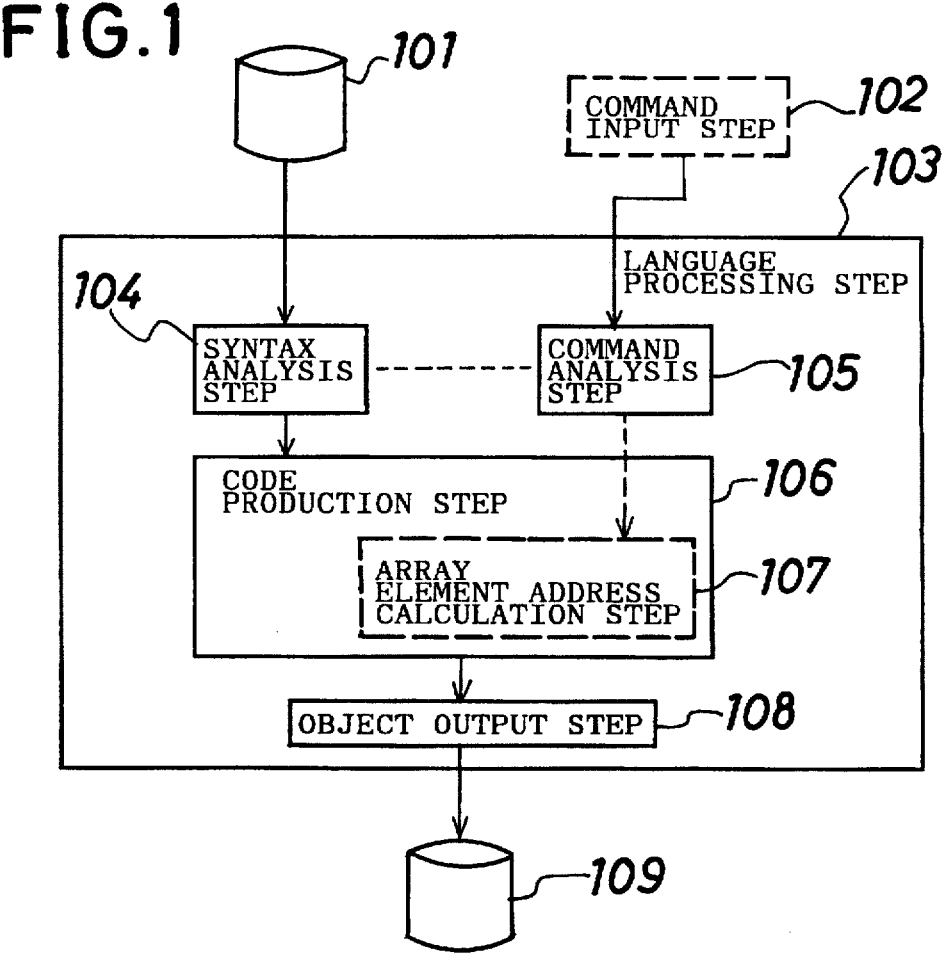
FIG. 1 is a system block diagram illustrating an entire language processing method of a first embodiment of the present invention.
FIG. 2 is a diagrammatic view illustrating an example of a command input of the language processing method illustrated in FIG. 1.

Referring first to FIG. 1, there is illustrated a language processing method according to a first preferred embodiment of the the present invention. The language processing method of the present embodiment is targeted at a machine architecture which involves a shift calculation of long data (4 bytes) of the C language.

A language processing step 103 includes a syntax analysis step 104 for inputting and analyzing an input source file 101 described in the C language, a command analysis step 105 for inputting and analyzing a command inputted at a command input step 102, a code production step 106 for producing a code in accordance with contents obtained by the syntax analysis, and an object output step 108 for outputting the code thus produced to an object file 109. Further, the code production step 106 includes an array element address calculation step 107 for selecting a suitable calculation method in accordance with a result of the analysis at the command analysis step 105.

In the present embodiment, when the maximum size of arrays appearing in the input source file is equal to or smaller than the int width of the target machine, this is designated by a command. Here, the int width is 2 bytes, and it is designated that the maximum size of arrays is equal to or smaller than 64 kilobytes. An example of a command inputted at the command input step 102 is illustrated in FIG. 2. "shortarray" is a command designation of the present example. The command analysis step 105 analyzes the designation and stores it as calculation method designation data.

When reference to an array element is recognized at the syntax analysis step 104, since an address of the array element must be calculated first, the array element address calculation step 107 of the code production step 106 is called. At the array element address calculation step 107, one of two array element address calculation algorithms is selected in accordance with the calculation method designation data obtained by the analysis at the command analysis step 105.

Figure 3:
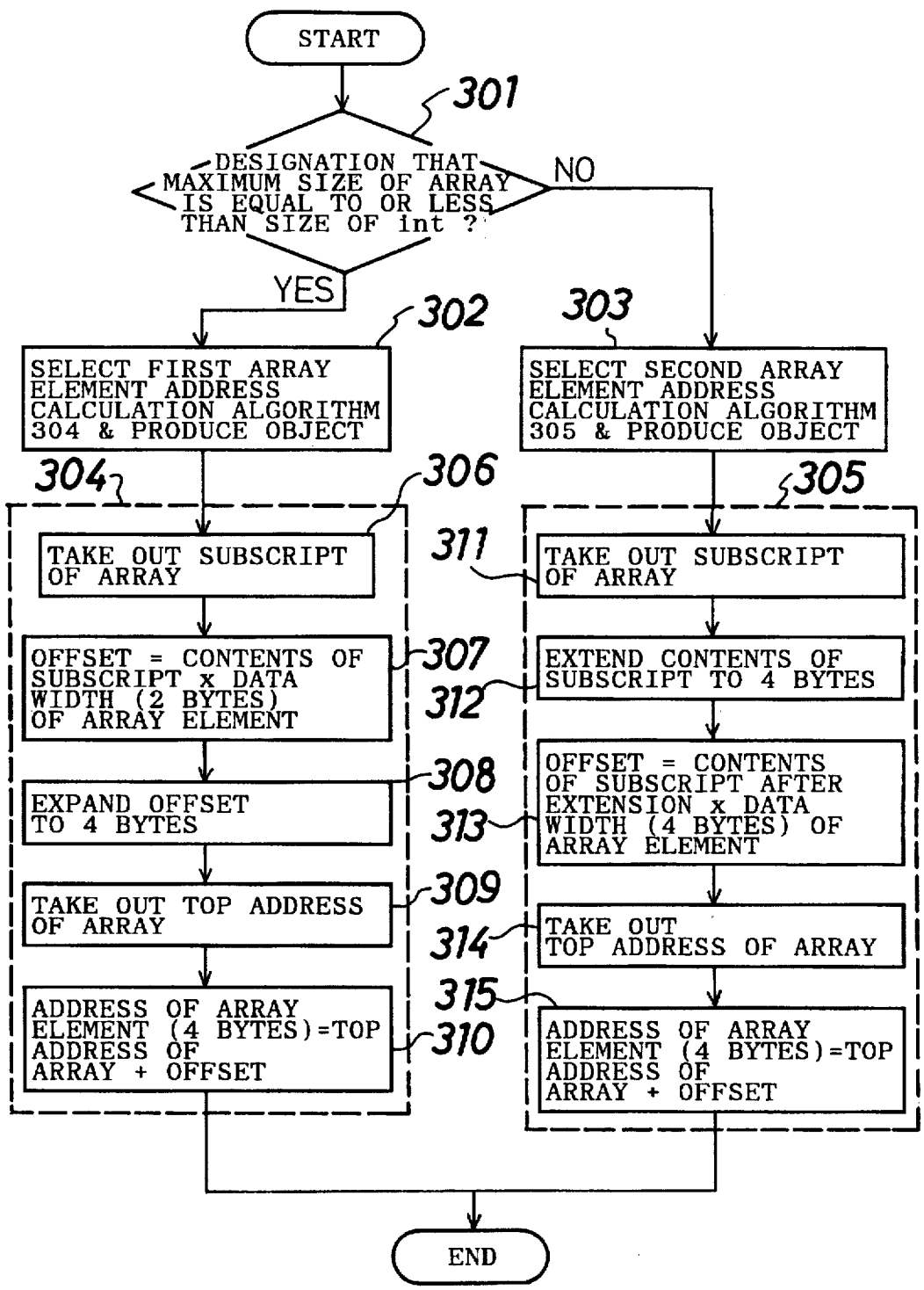
FIG. 3 is a flow chart of array element address calculation algorithm selection processing of the language processing method illustrated in FIG. 1.

A procedure of the array element address calculation 107 will be described below with reference to FIG. 3.

First, it is checked whether or not the calculation method designation data indicate that the array can be accommodated in the size of the int (step 301). If the array can be accommodated in the size of the int, then a first array element address calculation algorithm 304 is selected as an object to be produced, and production of an object is performed (step 302). If the array cannot be accommodated in the size of the int, then a second array element address calculation algorithm 305 which is the same as a conventional algorithm is selected, and production of an object is performed (step 303).

The first array element address calculation algorithm 304 first takes out a subscript of the array (step 306). Subsequently, multiplication between the contents (2 bytes) of the subscript thus taken out and the data width of the array element is performed to determine an offset first (step 307). Here, if the data width of the array element exceeds 2 bytes, then multiplication must necessarily be performed divisionally by a plurality of times. However, since the size of the subscript is 2 bytes, the load is lower than that of multiplication of 4 bytes×4 bytes. After an offset is obtained, this is expanded to the address width (4 bytes) (step 308). This is because, since addition to an address is performed subsequently, the data widths must necessarily be made equal to each other. An offset from the top of the array is calculated by the processing described above.

Subsequently, the top address of the array is taken out (step 309), and the top address of the array thus taken out and the offset calculated at step 308 are added to each other to obtain an address of the array element (step 310).

The second array calculation algorithm 305 is the same as the conventional array calculation algorithm described hereinabove with reference to FIG. 9. In particular, steps 311 to 315 in FIG. 3 are the same as the steps 901 to 905 in FIG. 9, respectively.

An example of the reference to an array element is illustrated in FIG. 4.

Since an array "tab" refers to the outside, the size of the array is indefinite. Meanwhile, address calculation is required for "tab[i]". Results of production of objects in accordance with the procedure described above are illustrated in FIGS. 5 and 6. FIG. 5 illustrates the results when it is designated by a command that the size of the array is equal to or smaller than the size of the int, and FIG. 6 illustrates the results when it is designated that the size of the array exceeds the size of the int.

In the present embodiment, since the data width of array elements is 4 bytes, a multiplication command is not used but a shift command is used at the multiplication step. As shown in FIGS. 5 and 6, when it is designated that the size of the array is equal to or smaller than the size of the int, the object size is totaling 19 bytes, but when the size of the array exceeds the size of the int, the object size is totaling 20 bytes. Since produced codes shown in FIG. 6 are the same as those which are outputted in accordance with the conventional array calculation algorithm, it can be seen that, when it is designated in the present embodiment that the size of the array is equal to or smaller than the size of the int, the size of the array is decreased by one byte from the conventional object size.

Subsequently, a language processing method of a second embodiment of the present invention will be described.

While it is designated, in the first embodiment described above, by way of inputting of a command whether or not the size of the array exceeds the size of the int, not all of the arrays are equal to or smaller than the size of the int or larger than the size of the int, but it is sometimes different among different arrays whether or not the size exceeds the size of the int. Therefore, in the present second embodiment, a command is provided which designates whether the size of the array is equal to or small than the size of the int or greater than the size of the int.

Figure 7:
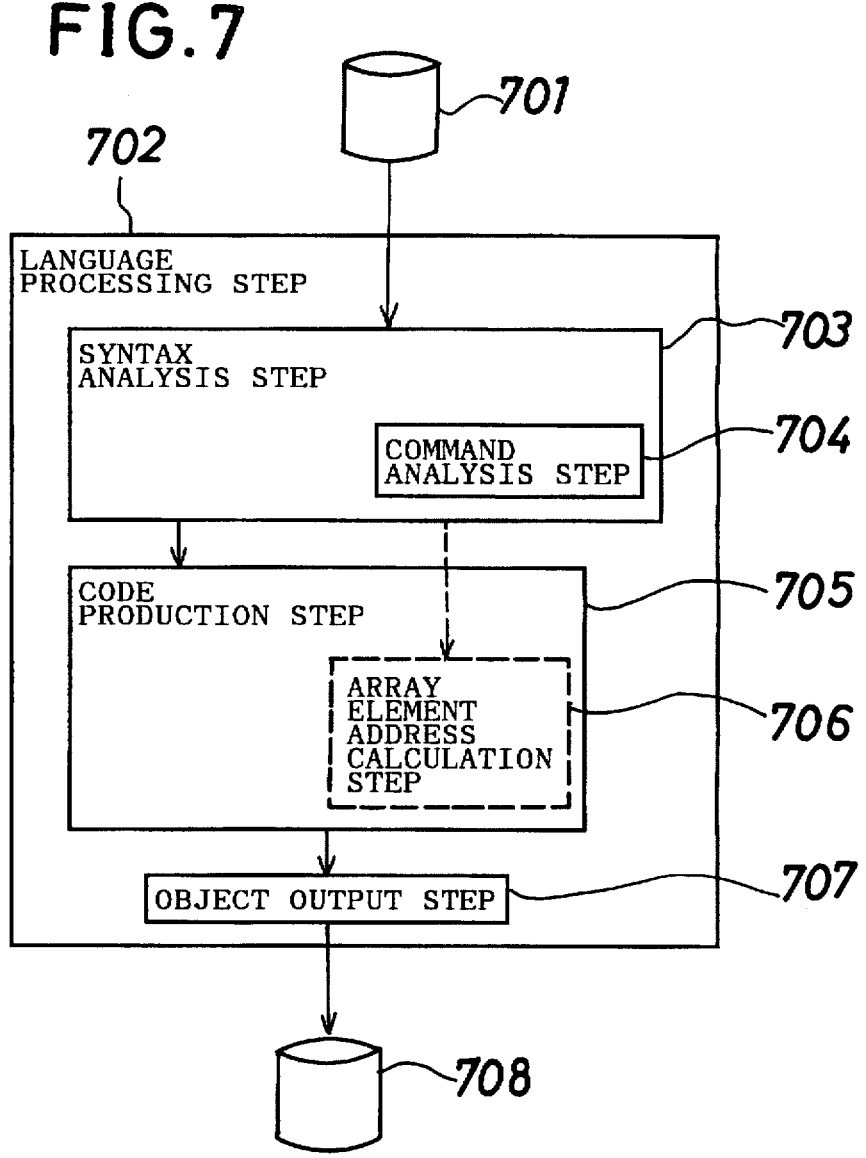
FIG. 7 is a system block diagram of an entire language processing method of a second embodiment of the present invention.

The language processing method of the second embodiment of the present invention is illustrated in FIG. 7. Referring to FIG. 7, a language processing step 702 includes the same steps as those of the first embodiment except that a command analysis step 704 is included in the syntax analysis step 703 and that no input data other than an input source file 701 is present.

Figures 8, 9:
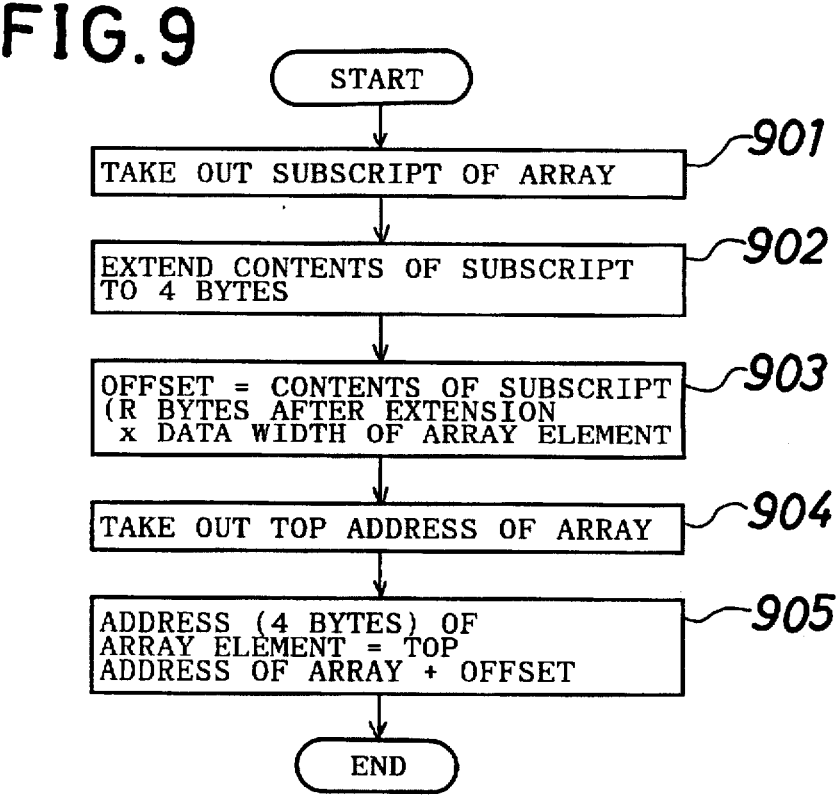
FIG. 8 is a diagrammatic view showing an example of an input source file of the language processing method illustrated in FIG. 7.
FIG. 9 is a flow chart of an array element address calculation algorithm of a conventional language processing method.

In the present embodiment, it is described in the input source file 701 whether or not the size of an array exceeds the size of the int as seen in FIG. 8. Symbols "short array" are described in a declaration portion as a command which indicates that the size of the array "tab1" shown in FIG. 8 is equal to or smaller than the size of the int.

After the syntax analysis step 703 recognizes the declaration of the array, whether or not the size of the array exceeds the size of the int is determined from presence or absence of a command designation whether the size of the array exceeds the size of the int at the command analysis step 704. Then, when reference to an array element is recognized in accordance with the determination at the command analysis step 704, an array element address calculation step 706 of a code production step 705 is called. The processing following this is the same processing as in the first embodiment, and accordingly, detailed description thereof is omitted herein.

Since, in the present second embodiment, the size of an array can be designated for each array, more delicate selection of an address calculation method than that in the first embodiment can be achieved.

Having now fully described the invention, it will be apparent to one of ordinary skill in the art that many changes and modifications can be made thereto without departing from the spirit and scope of the invention as set forth herein.

What is claimed is:

1. A language processing method, comprising steps of:
   inputting source program information;
   analyzing the thus inputted source program information to produce object information;
   calculating an address of an array element to be processed upon production of the object information; and
   outputting the object information thus produced,
   the step of calculating an address of an array element including steps of:
   (1) inputting a command which designates a maximum size of the array and analyzing whether the designated size is equal to or smaller than a fixed size;
   (2) taking out a subscript of the array when a result of the analysis is equal to or smaller than the fixed size;
   (3) calculating an offset from contents of the subscript thus taken out and a data width of the array element; and
   (4) calculating an address of the array element from the offset thus calculated and a top address of the array,
   said method further comprising a step of selecting based on a result of an analysis in said step (1), one of performing address calculation processing for an optimum array address in accordance with said steps (2) to (4), and performing an ordinary address calculation processing including a step of expanding an array index including said contents of the subscript thus taken out to a width for preventing a dropping of a digit in address calculation.

2. A language processing method as claimed in claim 1, wherein the command of designating a maximum size of the array is inputted from other than the source program information.

3. A language processing method as claimed in claim 1, wherein the command of designating a maximum size of the array is inputted from within the source program information.

4. A language processing method according to claim 1, wherein said offset comprises a distance from said array element to the top of said array.

5. A language processing method according to claim 1, wherein said step of inputting and analyzing an input source file comprises inputting and analyzing an input source file written in C language.

6. A language processing method according to claim 1, wherein a data width of array elements of said array is 4 bytes.

7. A language processing method according to claim 1, wherein said input source file includes a declaration portion which includes said command describing whether the size of the array exceeds the fixed size.

8. A language processing method according to claim 1, wherein said fixed size comprises a size of a data space of a target machine, said size being 2 bytes.

9. A language processing method according to claim 1, wherein said offset comprises a distance from said array element to the top of said array, and said step of inputting and analyzing an input source file comprises inputting and analyzing an input source file written in C language,
   wherein a data width of array elements of said array is 4 bytes, and wherein said input source file includes a declaration portion which includes said command describing whether the size of the array exceeds the fixed size,
   a data space of a target machine being 2 bytes.

10. A language processor, comprising:
    means for inputting source program information;
    means for analyzing the thus inputted source program information to produce object information;

means for calculating an address of an array element to be processed upon production of the object information; and means for outputting the object information thus produced, wherein said means for calculating an address of an array element includes:
  (1) means for inputting a command which designates a maximum size of the array and for analyzing whether the designated size is equal to or smaller than a fixed size;
  (2) means for taking out a subscript of the array when a result of the analysis is equal to or smaller than the fixed size;
  (3) means for calculating an offset from contents of the subscript
  (4) means for calculating an address of the array element from the offset thus calculated and a top address of the array, said language processor further comprising an address calculation processing section for an array element for selecting, based on a result of an analysis by said means for analyzing, one of performing address calculation processing for an optimum array address in accordance with operations by said means (2) to (4), and performing an ordinary address calculation processing including expanding an array index including said contents of the subscript thus taken out to a width for preventing a dropping of a digit in address calculation.

11. A language processor according to claim 10, wherein the command of designating a maximum size of the array is inputted from other than the source program information.

12. A language processor according to claim 10, wherein the command of designating a maximum size of the array is inputted from within the source program information.

13. A language processor according to claim 10, wherein said offset comprises a distance from said array element to the top of said array.

14. A language processor according to claim 1, wherein said means for inputting and analyzing an input source file comprises means for inputting and analyzing an input source file written in C language.

15. A language processor according to claim 10, wherein a data width of array elements of said array is 4 bytes.

16. A language processor according to claim 10, wherein said input source file includes a declaration portion which includes said command describing whether the size of the array exceeds the fixed size.

17. A language processor according to claim 10, wherein said fixed size comprises a size of a data space of a target machine, said size being 2 bytes.

* * * * *